United States Patent
Mittelmeier (10) Patent No.: US 11,162,474 B2
(45) Date of Patent: Nov. 2, 2021

(54) METHOD AND SYSTEM FOR DETERMINING AN ALIGNMENT CORRECTION FUNCTION

(71) Applicant: SENVION GMBH, Hamburg (DE)

(72) Inventor: Niko Mittelmeier, Hamburg (DE)

(73) Assignee: Senvion GmbH, Hamburg (DE)

( * ) Notice: Subject to any disclaimer, the term of this patent is extended or adjusted under 35 U.S.C. 154(b) by 154 days.

(21) Appl. No.: 16/279,194

(22) Filed: Feb. 19, 2019

(65) Prior Publication Data

US 2019/0323482 A1 Oct. 24, 2019

(30) Foreign Application Priority Data

Feb. 19, 2018 (DE) .......................... 102018001269.8

(51) Int. Cl.
*F03D 7/02* (2006.01)
*F03D 7/04* (2006.01)

(52) U.S. Cl.
CPC ........... *F03D 7/045* (2013.01); *F03D 7/0204* (2013.01); *F05B 2260/821* (2013.01); *F05B 2270/8042* (2013.01)

(58) Field of Classification Search
None
See application file for complete search history.

(56) References Cited

U.S. PATENT DOCUMENTS

| | | |
|---|---|---|
| 6,993,965 B2 | 2/2006 | Yoshida |
| 7,086,835 B2 | 8/2006 | Yoshida |
| 7,244,100 B2 | 7/2007 | Yoshida |
| 7,861,583 B2 * | 1/2011 | Honhoff ................. F03D 17/00 73/170.01 |
| 8,037,748 B2 | 10/2011 | Enevoldsen et al. |

(Continued)

FOREIGN PATENT DOCUMENTS

| | | |
|---|---|---|
| CN | 107577647 | 1/2018 |
| DE | 19934415 | 3/2005 |

(Continued)

OTHER PUBLICATIONS

Keck "A numerical investigation of nacelle anemometry for a HAWT using actuator disc and line models in CFX," Renewable Energy, Apr. 2012, vol. 48, No. 2, pp. 72-84.

(Continued)

*Primary Examiner* — Juan G Flores
(74) *Attorney, Agent, or Firm* — Sheridan Ross PC (57) ABSTRACT

A method for determining a correction function for a wind turbine, a method and system for determining an alignment correction function for a nacelle of a wind turbine, and a method for operating a wind turbine are provided. Measurement values of the power measure of the wind turbine and of the leeward wind direction are assigned to measurement values of the leeward wind speed, corrected by a correction function, and are grouped into at least one wind-speed bin on the basis of instants at which the measurement values were recorded. A model function is determined and outputted for a relationship between the power measure and the leeward wind direction for the wind-speed bin, and an alignment correction function is determined for a target alignment of the nacelle relative to the measured leeward wind direction on the basis of the model function.

17 Claims, 4 Drawing Sheets

(56) References Cited

U.S. PATENT DOCUMENTS

| | | | |
|---|---|---|---|
| 8,310,073 | B2 | 11/2012 | Enevoldsen et al. |
| 9,982,656 | B2 | 5/2018 | Li et al. |
| 10,436,174 | B2 | 10/2019 | Holtom |
| 2005/0042093 | A1 | 2/2005 | Yoshida |
| 2010/0066087 | A1* | 3/2010 | Hayashi .................. H02P 9/00 290/44 |
| 2012/0263591 | A1 | 10/2012 | Kwong |
| 2014/0348650 | A1 | 11/2014 | Hansen |
| 2016/0146195 | A1* | 5/2016 | Holtom .................... G01P 5/26 356/28 |
| 2016/0298607 | A1* | 10/2016 | Gregg .................. F03D 7/0224 |
| 2017/0284375 | A1 | 10/2017 | Nielsen |
| 2018/0003153 | A1 | 1/2018 | Damgaard |

FOREIGN PATENT DOCUMENTS

| | | |
|---|---|---|
| DE | 102016100647 | 8/2017 |
| DE | 102016121961 | 5/2018 |
| EP | 1505299 | 2/2005 |
| EP | 1508691 | 2/2005 |
| EP | 1793123 | 6/2007 |
| EP | 2154362 | 2/2010 |
| EP | 3225838 | 10/2017 |
| KR | 10-1383792 | 4/2014 |
| WO | WO 2012/089214 | 7/2012 |
| WO | WO 2016/008500 | 1/2016 |
| WO | WO 2017/178027 | 10/2017 |

OTHER PUBLICATIONS

Official Action for German Patent Application No. 102018001269.8, dated Jan. 8, 2019, 7 pages.

Extended Search Report for European Patent Application No. 19157529.9, dated Jul. 10, 2019, 10 pages.

\* cited by examiner

METHOD AND SYSTEM FOR DETERMINING AN ALIGNMENT CORRECTION FUNCTION

CROSS-REFERENCE TO RELATED APPLICATIONS

This application claims the benefit of German Patent Application No. DE 10 2018 001 269.8 filed Feb. 19, 2018, the entire contents of which are incorporated herein by reference.

FIELD OF THE INVENTION

The present invention relates to a method for determining a correction function for a wind turbine, to a method and a system for determining an alignment correction function for a nacelle of a wind turbine, to a method for operating a wind turbine, to a computer program, and to a computer-readable medium.

BACKGROUND OF THE INVENTION

Usually, nacelles of wind turbines are aligned on the basis of a measured wind direction, in such a manner that the power generated by the wind turbine becomes as maximal as possible. In the case of an incident flow that is perpendicular to the rotor plane, the theoretically maximal power take-up in this case is determined by the wind. Owing to the size of the rotor blades, however, the incident wind does not strike the rotor blades perpendicularly everywhere. In general, the maximal power cannot be achieved by aligning the rotor perpendicularly to the incident wind at hub height, such that a rotor axis of the rotor that runs through the rotor hub is parallel to the wind direction, since the wind normally increases with increasing distance from the ground, and thus the maximal power is not taken up at the level of the rotor hub, and/or the rotor blades receive incident flow from different directions in different portions of the rotor.

Moreover, in the case of feedback control of the alignment of the nacelle on the basis of the measured wind direction, it must be taken into account that the wind direction is influenced by swirl caused by the rotor blades, and by turbulences on a leeward side of the rotor, since normally the wind direction is measured on a leeward side of the rotor, for example by means of a wind vane (also called an "anemotropometer" or "direction indicator" herein) arranged on the roof of the nacelle. Note that the terms "wind vane," "anemotropometer," and "direction indicator" as used herein refer to any device that is capable of measuring or indicating a wind direction.

It is therefore known from the prior art to add a constant compensation value to the measured wind direction, in order to achieve the desired alignment of the nacelle relative to the wind direction prevailing on the windward side of the rotor.

For example, the publication DE 199 34 415 B4 relates to a method for wind tracking in the case of wind turbines, the setting of an angle between the direction of a rotor axis and a wind direction being effected on the basis of the sensing and joint evaluation of wind direction, wind speed and generated power. In this case, for an optional number of power curves for differing angles between a wind direction and a rotor axis, a vertex of the power curves is determined for differing angles of incidence in the case of the currently prevailing wind speed, and the current deviation from the optimal angle of attack is corrected.

SUMMARY OF THE INVENTION

It is an object of the invention to improve, in particular to render more precise, the measurement of quantities, in particular of a wind speed, required for aligning a nacelle of a wind turbine. In particular, it is an object of the invention to enable alignment of the nacelle of the wind turbine to be improved.

This object is achieved by a method for determining a correction function for a wind turbine, a method and a system for determining an alignment correction function for a nacelle of a wind turbine, a method for operating a wind turbine, a computer program, and a computer-readable medium, as claimed in any one of the independent claims. Preferred embodiments are provided by the dependent claims.

A first aspect of the invention relates to a method for determining a correction function, in particular a transfer function, for a wind turbine, by means of which a windward wind speed can be determined on the basis of leeward wind speed measured by a leeward-side anemometer of the wind turbine, windward and leeward relating to a rotor of the wind turbine. The method comprises the following work steps: (i) measuring a windward wind speed, a leeward wind speed and a leeward wind direction, a multiplicity of measurement values being recorded in a defined time period in each case; (ii) determining the correction function, in particular the transfer function, on the basis of the recorded measurement values by means of a model, the recorded measurement values being related to each other in the model, and the correction function, in particular the transfer function, assigning a windward wind speed to a leeward wind speed in dependence on a leeward wind direction; and (iii) outputting the determined correction function. Windward, or windward-side, within the meaning of the invention, denotes a region on a side of the rotor of the wind turbine that faces towards the wind. Leeward, or leeward-side, within the meaning of the invention, denotes a region on a side of the rotor of the wind turbine that faces away from the wind.

A leeward wind direction within the meaning of the invention is, in particular, the wind direction, determined by means of a leeward-side wind vane of the wind turbine, from which the wind vane receives the incident wind that has passed through the rotor. The leeward wind direction in this case is preferably measured with respect to a rotor axis of the rotor of the wind turbine and specified as an angle with respect to the rotor axis.

The nacelle of the wind turbine can be aligned on the basis of the leeward wind direction, preferably with a compensation value being taken into account, for example in that the nacelle is rotated in such a manner that the leeward wind direction and the rotor axis are at least substantially parallel to each other. A compensation value within the meaning of the invention is, in particular, a correction value, which is added onto the leeward wind direction in order to take account of influencing of the wind direction by the rotor in the aligning of the nacelle. The compensation value may depend, in particular, on the windward wind speed.

Windward wind speed within the meaning of the invention means, in particular, a measure of the speed of the representative, undisturbed flow that is incident upon the rotor. Preferably, the windward wind speed is a measure of the energy contained in the flow that is incident upon the rotor. This may be a representative point measurement, e.g. on a measurement mast. However, it does not necessarily mean that it is a wind speed that can be physically measured at a point in the space in front of the rotor because, in the case of the nowadays usual rotor diameters of well over 100 meters, the representative windward wind speed is generally averaged in respect of space and/or time, in order to reduce the influence of the stochastic turbulence. This may be effected, preferably, by spatial measurement methods, such as usual Lidar arrangements.

Preferably, the measurement of the windward wind speed is effected at a location in the environment that is representative of the windward wind speed of the wind turbine, but that is not windward of the wind turbine. In a complex wind farm, such locations may be determined, for example, empirically or by elaborate CFD simulations.

Further, preferably, the measurement of the windward wind speed is effected windward of the wind rotor, since a particularly high reliability of the measurement is thus achieved.

Determination of a correction function within the meaning of the invention is, in particular, establishing of coefficients, preferably regression coefficients, of a model on which the correction function is based. A correction function may be determined, for example, by means of a fit of measurement values according to the model.

Relating measurement values to each other within the meaning of the invention involves, in particular, compiling and/or solving an equation system into which the measurement values are entered. Preferably, the equation system in this case contains regression coefficients of the model, which are established on the basis of the measurement values entered into the equation system. Alternatively or additionally, relating measurement values to each other, as already described previously, may also be fitting the measurement values, in particular according to the model, or according to a model function describing the model, regression coefficients of the model preferably also being established here. As a further alternative, it may also in this case be the storing of averaged measurement results in the form of a look-up table, i.e. as simple table function. This has the advantage that, unlike a model, no assumptions need be made concerning a physical relationship. Preferably, there can then be interpolation between the individual table values.

It was identified that a dependence exists between measurement values for a leeward wind speed and measurement values for a windward wind speed that are each recorded at least substantially at the same instants, entering into which dependence is the alignment of the nacelle relative to the wind incident upon the rotor. The alignment of the nacelle is preferably entered in the form of a measured leeward wind direction, if necessary with a compensation value being taken into account. The dependence can therefore be ascertained with the leeward wind direction being taken into account.

Advantageously, the described dependence may be based on a model, in particular a mathematical model, on the basis of which a correction function can be determined for measured leeward wind speed. By use of the correction function, wind speeds prevailing on the windward side can thereby be inferred from wind speeds measured on the leeward side.

Preferably, the model is configured on the basis of measurement values that denote a leeward wind direction, a leeward wind speed and a windward wind speed, in that the measurement values are related to each other in the model, such that conclusions can be drawn concerning the effect, in particular of the nacelle alignment, or of the measured leeward wind direction, upon the relationship between the measured leeward wind speed and the measured windward wind speed.

This allows a reliable and precise determination of windward wind speeds on the basis of measured leeward wind speeds and measured leeward wind directions in the use of the correction function. Once the correction function is known, the windward wind speeds can be determined, in particular irrespective of the alignment of the nacelle of the wind turbine, because influences that are caused by the alignment can be corrected by the measurement of the leeward wind direction by means of the correction function.

Preferably, as part of the recording of a multiplicity of measurement values over the specified time period, a measurement value is recorded, respectively, at different instants within the time period, for the windward wind speed, the leeward wind speed and the leeward wind direction. In particular, a measurement value may be repeatedly recorded, respectively, for the windward wind speed, the leeward wind speed and the leeward wind direction, at least substantially simultaneously. In this case the instants at which in each case three measurement values are recorded may be distributed at least in a partly regular manner and/or at least in a partly irregular manner over the time period.

The recorded measurement values are preferably time measurement values, in particular sliding measurement values. Preferred averaging times are, in particular, at least 10 seconds, in particular at least 30 seconds, in particular preferably approximately 1 minute.

In a preferred embodiment, the model is a multilinear regression model. Preferably, according to the model, each measurement for the windward wind speed is, preferably linearly, dependent on a measurement value for the leeward wind speed and a measurement value for the leeward wind direction. Each measurement value in this case may be weighted with a respective regression coefficient. The correction function can thereby be determined in a rapid and reliable manner, even with little computing complexity.

In a further preferred embodiment, the correction function is determined on the basis of a compensation calculation, in particular a regression analysis. Preferably in this case, regression coefficients of the model function are determined by the method of least error squares. The correction function, in particular its regression coefficients, may be determined, for example, by a three-dimensional fit of the measured wind speeds and the associated wind directions. This makes it possible to determine a correction function that reliably specifies the relationship between leeward wind directions and windward wind directions.

In a further preferred embodiment, the windward wind speed is determined by means of a sensor device. Preferably, the sensor device in this case is configured as a Lidar instrument, Sodar instrument, or reference anemometer. The windward wind speed can thereby be determined in a reliable and precise manner.

The sensor device in this case may be arranged, in particular, on a tower that carries the nacelle of the wind turbine, or on the nacelle, in particular on a rotor hub of the rotor, of the wind turbine. The measurement values for the windward wind speed that are recorded by the sensor device are therefore advantageously not influenced, or at least are only slightly influenced, by the rotor motion, and are particularly clearly differentiated from the measurement values for the leeward wind speed. In particular, the above arrangement additionally makes it possible to determine windward wind speed relevant to the wind turbine, in a region directly in front of the rotor. The determined correction function therefore enables the windward wind speed to be calculated in a particularly precise manner.

In a further preferred embodiment, the sensor device is arranged on the windward side and separately from the wind turbine, in particular on an adjacent wind turbine. A windward-side arrangement of the sensor device within the meaning of the invention is, in particular, an arrangement, relative to the wind turbine, in which the sensor device receives incident air masses that are then also incident upon the rotor of the wind turbine.

The sensor device in this case may be arranged close to the ground, in particular on the ground, or on a tower, in particular at least substantially at the level of the rotor hub of the wind turbine. It can thereby be ensured that the measured windward wind speeds are representative of the speed of the wind that is incident upon the rotor of the wind turbine.

A second aspect of the invention relates to a method for determining an alignment correction function for a nacelle of a wind turbine that is arranged on a tower, the wind turbine having at least one anemometer arranged on a leeward side of a rotor of the wind turbine, and a wind vane arranged on the leeward side of the rotor. The method comprises: (i) measuring a power measure of the wind turbine, a leeward wind direction by means of the wind vane and a leeward wind speed by means of the at least one anemometer, a multiplicity of measurement values being recorded over a defined time period in each case; (ii) assigning measurement values of the power measure and of the leeward wind direction to measurement values of the leeward wind speed that are grouped into at least one wind-speed bin, on the basis of instants at which the measurement values were recorded; preferably, the measurement values of the leeward wind speed are corrected by means of a correction function determined according to a method according to the first aspect of the invention; (iii) determining a model function for a relationship between the power measure and the leeward wind direction for the at least one wind-speed bin; (iv) determining an alignment correction function for a target alignment of the nacelle relative to the measured leeward wind direction, on the basis of the model function, the alignment correction function fulfilling a predefined criterion in respect of the determined model function for the at least one wind-speed bin; and (v) outputting the determined alignment correction function.

An alignment correction function within the meaning of the invention is, in particular, a correction value or correction factor, by means of which an alignment of the nacelle of the wind turbine can be aligned, in particular in respect of optimizing output power, or at least improving output power. The alignment correction function is preferably determined as a correction value in dependence on the measured leeward wind direction, or as a correction angle function, which may depend on one or more variables, for example an air pressure, an air humidity, a wind speed, a location of a wind turbine in a wind farm and/or the like.

A power measure within the meaning of the invention is, in particular, a measure of the power that is generated, or can be generated, from the wind energy. The power measure may be, in particular, a rotor rotational speed, a generator output power or the like.

Determination of a model function within the meaning of the invention is, in particular, establishing of coefficients, preferably regression coefficients, of a model on which the model function is based. A model function may be determined, for example, by means of a fit of measurement values.

A model function within the meaning of the invention may be used, in particular, to assign, in particular in a precise manner, a power measure to any measured leeward wind direction.

A wind-speed bin within the meaning of the invention is, in particular, a wind-speed interval. Recorded measurement values may be assigned to a wind-speed bin, in that a measured leeward wind speed measured at least at substantially the same instant, or its corrected value, which is intended to represent the windward wind speed, or a corresponding mean value of a plurality of leeward wind-speed measurements, are assigned to the corresponding wind-speed bin. In particular, tuples of measurement values that were recorded at least at substantially the same instant may be assigned to a wind-speed bin on the basis of at least one measurement value for a leeward wind speed that is contained in the tuple.

A predefined criterion within the meaning of the invention is, in particular, a condition that must be fulfilled by the model function. Preferably, the angle or angular range for which the predefined criterion is fulfilled is output as an alignment correction function.

A relationship between the power measure and the leeward wind direction determined by means of a wind vane, within the meaning of the invention, may be, in particular, a relationship between the power measure and an alignment of a nacelle. In particular, the measured leeward wind direction may define a target nacelle alignment, such that the alignment of the nacelle can be comprehended in relation to the target nacelle alignment.

Preferably, the wind vane is mounted in a defined alignment on the nacelle, such that, in the case of an alignment of the nacelle in which a rotor axis is aligned parallel to the direction from which the wind vane receives incident flow, the wind vane preferably outputs values of 0° for the leeward wind direction. The alignment of the nacelle can therefore be comprehended as a deviation of the rotor axis from the leeward wind direction.

In the definition of the target nacelle alignment, in particular a compensation value may also be taken into account, in addition to the leeward wind direction. The aforementioned relationship may thus relate, in particular, to the power measure and a mis-alignment of the nacelle, the mis-alignment of the nacelle corresponding to a deviation from the alignment of the nacelle defined by the leeward wind direction and the compensation value.

The second aspect of the invention is based, in particular, on the knowledge that, in correcting the alignment of the nacelle of a wind turbine, the wind speed, in particular at which the rotor receives incident flow, should be taken into account, since it has been found, for example, that, in the case of changing wind conditions, differing angles, between the rotor axis and the direction from which the rotor receives incident flow at the level of the rotor hub, are in each case advantageous in respect of the power that can be generated by the wind turbine. In other words, for example, optimization of output power, or at least improvement of output power, can be performed in a particularly effective manner in that an alignment correction function is taken into account for various wind-speed bins, in particular respectively one correction angle for each wind-speed bin. Preferably, the model function is determined for a relationship between the power measure and the leeward wind direction, for the at least one wind-speed bin, on the basis of measurement values of the leeward wind speed corrected by means of a correction function according to the invention, in particular according to the first aspect of the invention. Further, preferably, for this purpose the measurement values of the power measure and the leeward wind direction are assigned to windward wind speeds that arise from corrected measurement values for the leeward wind speed that were recorded at the same instants as the measurement values for the power measure and the leeward wind direction, and that are grouped into at least one wind-speed bin. The alignment correction function can thereby be determined in such a manner that the predefined criterion in respect of the model function can be fulfilled in a precise manner by the alignment correction function in the case of a variety of wind speeds. The correction according to the invention, in the determination of which the measured leeward wind direction is taken into account, thus achieves improved accuracy in the alignment of the wind turbine. This renders possible, in particular, an improved power yield from the wind turbine. Thus, for example, the nacelle can always be aligned on the basis of the output alignment correction function, even in the case of differing wind speeds, such that the power generated by the wind turbine is improved.

Preferably, the method may be applied, in the case of a prototype for a wind turbine type, or in the case of a wind turbine that is representative of a quantity of wind turbines, in order to obtain the alignment correction function and the wind-speed correction function, in particular a plurality of correction angles, or correction functions, for a multiplicity of wind-speed bins. The alignment correction function may then be used for structurally identical or similar wind turbines.

In a further preferred embodiment, the criterion is a maximization of the model function. Preferably, the alignment correction function is determined as a correction angle or correction angle range for which the determined model function assumes a maximum value. Since the model function preferably specifies the assignment of the leeward wind speed, or of a mis-alignment of the nacelle, which is dependent on the leeward wind speed and a compensation value, to a power measure of the wind turbine in at least one wind-speed bin, this maximum value may correspond to a maximally achievable power of the wind turbine, at least in the present configuration, e.g. in the case of the selected angle of attack of the rotor blades, in this wind-speed bin. The choice of the criterion as a maximization of the model function therefore makes it possible to optimize the power of the wind turbine in a reliable and, in particular in respect of the wind speed, flexible, manner on the basis of the output alignment correction function.

In a further preferred embodiment, the power measure is a rotor rotational speed of the rotor or a generator rotational speed of a generator of the wind turbine. The power measure can thereby be established in a reliable and rapid manner, and specifies the power that is generated, or that can be generated, by the wind turbine.

In a further preferred embodiment, the model function is determined for a plurality of wind-speed bins. Preferably, the output alignment correction function forms an operating characteristic for the target alignment of the nacelle relative to the measured leeward wind direction. The alignment correction function in this case is preferably output as a correction angle function, which depends on the wind speed and which, for a variety of wind speeds, in each case specifies a correction angle to be taken into account in the aligning of the nacelle. The operating characteristic for the target alignment of the nacelle relative to the measured leeward wind direction can be stored and/or evaluated particularly easily by a wind turbine controller, and enables the wind turbine to be operated with consistently improved power generation.

A third aspect of the invention relates to a method for operating a wind turbine that has a nacelle arranged on a tower, a rotor and an anemometer, the anemometer being arranged leeward of the rotor. The method comprises the following work steps: (i) determining a leeward wind speed by means of the anemometer; and (ii) aligning the nacelle by use of an alignment correction function, in particular an operating characteristic, that was determined according to the method according to the second aspect of the invention, with the determined leeward wind speed being taken into account. Preferably, the alignment correction function, in particular the operating characteristic, is determined after the wind turbine is put into operation, for example in a calibration period, to enable the wind turbine to be operated at a subsequent point in time with the then determined alignment correction function. The wind turbine can thereby also be operated with improved power generation over a longer operating period.

A fourth aspect of the invention relates to a computer program, which comprises instructions that, when they are executed by a computer, cause the latter to execute the steps of a method according to the first, second or third aspect of the invention.

A fifth aspect of the invention relates to a computer-readable medium, on which a computer program according to the fourth aspect of the invention is stored.

A sixth aspect of the invention relates to a system for determining an alignment correction function for a nacelle of a wind turbine that is arranged on a tower and has at least one anemometer, a wind vane and a control facility. Preferably, the at least one anemometer and the wind vane are arranged on a leeward side of a rotor of the wind turbine. The control facility preferably has: (i) a means for recording a multiplicity of measurement values of a leeward wind speed determined by means of the anemometer, of a leeward wind direction determined by means of the wind vane, and of a power measure of the wind turbine, over a defined time period; (ii) a means for assigning measurement values of the power measure and of the leeward wind direction to measurement values of the leeward wind speed that are grouped into at least one wind-speed bin, on the basis of instants at which the measurement values were recorded, the measurement values of the leeward wind speed preferably being corrected by means of a correction function, in particular according to the first aspect of the invention; (iii) means for determining a model function for a relationship between the power measure and the leeward wind direction for the at least one wind-speed bin; (iv) means for determining an alignment correction function for a target alignment of the nacelle relative to the measured leeward wind direction, on the basis of the model function, the alignment correction function fulfilling a predefined criterion in respect of the determined model function for the at least one wind-speed bin; and (v) an interface for outputting the determined alignment correction function.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The invention is explained in greater detail in the following on the basis of non-limiting exemplary embodiments, which are represented in the figures. There are shown therein, at least partly in schematic form.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figures 1, 2:
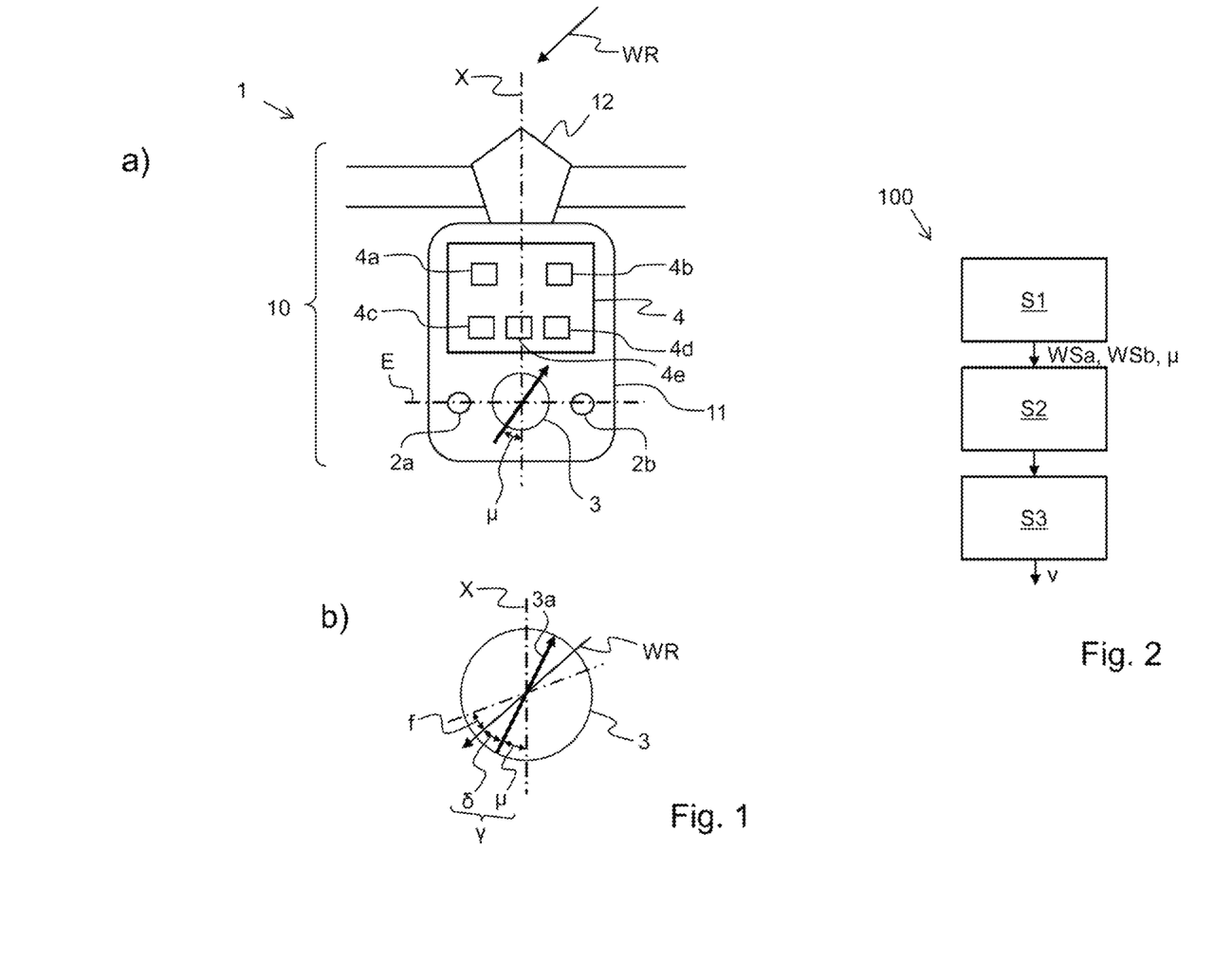
FIG. 1 a preferred exemplary embodiment of a system according to the invention for determining an alignment correction function.
FIG. 2 a preferred exemplary embodiment of a method according to the invention for determining a correction function.

FIG. 1, in figure part a), shows a preferred exemplary embodiment of a system 1 according to the invention for determining an alignment correction function f for a nacelle 11 of a wind turbine 10 that is arranged on a tower and has two anemometers 2a, 2b, a wind vane 3 and a control facility 4 that is connected to the two anemometers 2a, 2b and the wind vane 3.

The two anemometers 2a, 2b and the wind vane 3 are preferably arranged on the nacelle 11, the nacelle carrying a rotor 12 that has at least two, in particular three, rotor blades. The anemometers 2a, 2b and the wind vane 3 in this case may be arranged, in particular, on a leeward side of the rotor 12, such that the anemometers 2a, 2b measure leeward wind speeds and the wind vane 3 measures a leeward wind direction p. Preferably, the two anemometers 2a, 2b, together with the wind vane 3, are arranged in a plane E that is perpendicular to a rotor axis X of the rotor 12.

The wind vane 3 is shown schematically in an enlarged representation in FIG. 1b). Usually, the wind vane 3 is aligned, in particular mounted, on the nacelle 11 in such a manner that a defined alignment of the wind vane 3, to which the wind directions output by the wind vane 3 relate, is at least substantially parallel to the rotor axis X. The wind direction $\mu$ measured by the anemotropometer 3, for example, by means of a wind vane 3a, therefore preferably corresponds to the angle between the direction from which the anemotropometer 3 receives incident flow and the rotor axis X.

Since the wind that is incident upon the rotor 12 on the windward side, from a wind direction WR, is deflected by the rotor 12, the wind direction p measured by means of the wind vane 3 does not correspond to the windward-side wind direction WR. In order to correct this variation, a compensation value $\delta$, which is determined, for example, empirically, may be added to the measured leeward wind direction $\mu$. Thus, if a leeward wind direction $\mu$ is measured and the nacelle is rotated by an angle $\gamma=\mu+\delta$, the rotor axis X can be aligned at least substantially parallel to the windward wind direction WR. The angle $\gamma$ is also referred to as misalignment, or so-called yaw error.

As shown in FIG. 1a), the control facility 4 preferably has a means 4a for recording a multiplicity of measurement values of the first and/or second anemometer 2a, 2b and of the wind vane 3, which are generated by the anemometers 2a, 2b and the wind vane 3 over a defined time period, and made available. The means 4a in this case may be configured to correct the measurement values of the first and/or second anemometer 2a, 2b for the wind speed on the basis of a correction function, in particular a transfer function, such that they correspond to a speed of the wind on the windward side of the rotor 12 (see FIG. 2). In particular, the means 4a can thereby record measurement values that correspond to a windward wind speed.

The means 4a is preferably furthermore configured to record measurement values for a power measure of the wind turbine 10 over the defined time period. The measurement values for the power measure may be measured, for example, by measurement of the rotor rotational speed of the rotor 12, or a generator rotational speed of a generator of the wind turbine 10 that is connected to the rotor 12.

The means 4a for recording a multiplicity of measurement values is preferably configured to record, respectively, a last-generated measurement value from the first and/or second anemometer 2a, 2b and from the wind vane 3, at least substantially synchronously with a measurement value for a power measure. The means 4a may, in particular, record tuples of measurement values, each tuple containing a measurement value for the power measure, a measurement value for the leeward wind direction and a measurement value for the, if necessary corrected, leeward wind speed.

The control facility 4 further preferably has a means 4b for assigning measurement values of the power measure and of the leeward wind direction $\mu$, in particular of the misalignment $\gamma$, to measurement values of the leeward wind speed that are grouped into at least one wind-speed bin and if necessary corrected, on the basis of instants at which the measurement values were recorded. In this case, a measurement value for the power measure and a measurement value for the leeward wind direction $\mu$ are preferably assigned to that measurement value for the leeward wind speed that was recorded at least substantially at the same instant, in particular in the same time period, by the means 4a. In particular, the measurement values from a tuple may be assigned to each other, the measurement values for the leeward wind speed from differing tuples being able to be classified into at least one wind-speed bin.

Preferably, the control facility 4 furthermore has a means 4c for determining a model function for a relationship between the power measure and the leeward wind direction $\mu$ for the at least one wind-speed bin. For this purpose, in particular, the measurement values of the power measure (P)

and of the leeward wind direction (μ) assigned to the measurement values of a speed bin of the leeward wind speed are used for the at least one wind-speed bin (j). The means 4c of determining the model function is preferably configured to find a mathematical relationship for the dependence of the measured power measure on the measured leeward wind direction μ, or on the mis-alignment γ, in a wind-speed bin in each case. The means 4c may be configured, for example, to perform a compensation calculation, within which the model function, in particular a polynomial model, is based. The means 4c may be configured, for instance, to approximate the dependence of the power measure on the measured wind directions μ, or the mis-alignment γ determined in dependence on the wind directions μ, with a fit.

For example, the relationship between the measured power measure and the measured wind direction μ may be specified by a polynomial having a plurality of regression coefficients. These regression coefficients may be established by a compensation calculation, in particular a regression analysis.

The control facility 4 preferably furthermore has a means 4d for determining at least one alignment correction function f for a target alignment of the nacelle relative to the measured leeward wind direction μ, or to the mis-alignment γ based on the measured leeward wind direction μ, on the basis of the determined model function, the alignment correction function f fulfilling a predetermined criterion in respect of the determined model function for the at least one wind-speed bin. The means 4d in this case is preferably configured to establish a value, for the leeward wind direction μ or the mis-alignment γ, at which the model function assumes a maximum, i.e. for which the power measure is maximal.

The control facility 4 preferably furthermore has an interface 4e, which is configured to specify the determined alignment correction function f. The alignment correction function f, which in particular may be a correction angle or a correction angle function, may be used to set the alignment of the nacelle 11, or of the rotor axis X, relative to the windward wind direction WR in such a manner that the output power of the wind turbine 10 is improved.

FIG. 2 shows a preferred exemplary embodiment of a method 100 for determining a correction function v for a wind turbine, which preferably has an anemometer, for measuring a wind speed, and a wind vane, for measuring a wind direction, the anemometer and the wind vane preferably being arranged on the leeward side of a rotor of the wind turbine, for example on a nacelle of the wind turbine. The wind direction measured by the wind vane may therefore be, in particular, a leeward wind direction, and the wind speed measured by the anemometer may therefore be a leeward wind speed.

In a method step S1, a windward wind speed WSa is measured, windward wind speed WSa preferably denoting the representative speed at which the rotor of the wind turbine receives incident wind. In addition, the leeward wind direction p and the leeward wind speed WSb are measured, a multiplicity of measurement values being recorded within a defined time period in each case.

The windward wind speed WSa may be measured, for example, by means of a sensor device, in particular by means of a Lidar instrument, a Sodar instrument, or a reference anemometer, the sensor device preferably being arranged on the windward side of the wind turbine, in such a manner that, after passing the sensor device, the wind that is incident upon the sensor device is also incident upon the rotor of the wind turbine. The leeward wind direction p and the leeward wind speed WSb are measured on the leeward side by the anemometer, or the wind vane.

Since the rotor of the wind turbine influences the wind passing through an area that is swept by the rotor blades of the rotor, both in the direction of propagation and in the speed, the measured leeward wind direction μ does not correspond to the direction from which the wind is incident upon the rotor, and the measured leeward wind speed WSb also does not correspond to the measured windward wind speed WSa. For example, turbulences generated by the rotor, the energy extracted by the rotor and the swirl may result both in a change in the direction of the wind on the leeward side of the rotor, and in a decrease in the wind speed.

In a further method step S2, a correction function v is determined, on the basis of the recorded measurement values, by means of a model, the recorded measurement values being related to each other in the model. The correction function v in this case preferably specifies the relationship between the windward wind speed WSa and the leeward wind speed WSb in dependence on the leeward wind direction μ, i.e. by means of the correction function v, a corresponding windward wind speed WSa may be assigned to a measured leeward wind speed WSb in dependence on the leeward wind direction μ. In particular, the correction function v allows a correction of measured leeward wind speeds WSb in respect of the turbulences caused by the rotor.

The correction function v is preferably based on a multilinear regression model having regression coefficients β, the regression coefficients β preferably being established as part of the determination of the correction function v. For example, the assignment of the measurement values for the windward wind speed WSa, for the leeward wind speed WSb and for the leeward wind direction μ to each other may be approximated by means of a three-dimensional fit.

Preferably, the measurement values are related to each other in an equation system for establishing the regression coefficients β. The measurement values for the windward wind speed WSa, the measurement values for the leeward wind speed WSb and the measurement values for the leeward wind direction p may in each case be combined, for example, to form a vector $\underline{WSa}=[WSa_1, \ldots, WSa_n]$, $\underline{WSb}=[WSb_1, \ldots, WSb_n]$ and $\underline{\mu}=[\mu_1, \ldots, \mu_n]$, wherein the index $i=1, \ldots, n$ denotes the $i^{th}$ measurement value, and n is the number of measurement values. The vectorially combined measurement values may be used, within a matrix equation $\beta=(Y'\cdot Y)^{-1}\cdot Y'\cdot \underline{WSa}$, to establish the regression coefficients $\underline{\beta}=[\beta_1, \ldots, \beta_m]$. In this case, $Y=[\underline{1}, \underline{WSb}, \underline{\mu}]$ is a matrix that contains the vectorially combined measurement values for the leeward wind speed WSb and the leeward wind direction μ. Y' in this case is the transpose of the matrix Y, and $Y^{-1}$ is the inverse of the matrix Y.

Instead of the measured leeward wind direction μ, a mis-alignment may also be used, which takes account of the influence of the rotor upon the measured leeward wind direction μ in the form of an, in particular constant, compensation value.

In a further method step S3, the correction function v is output.

Figure 3:
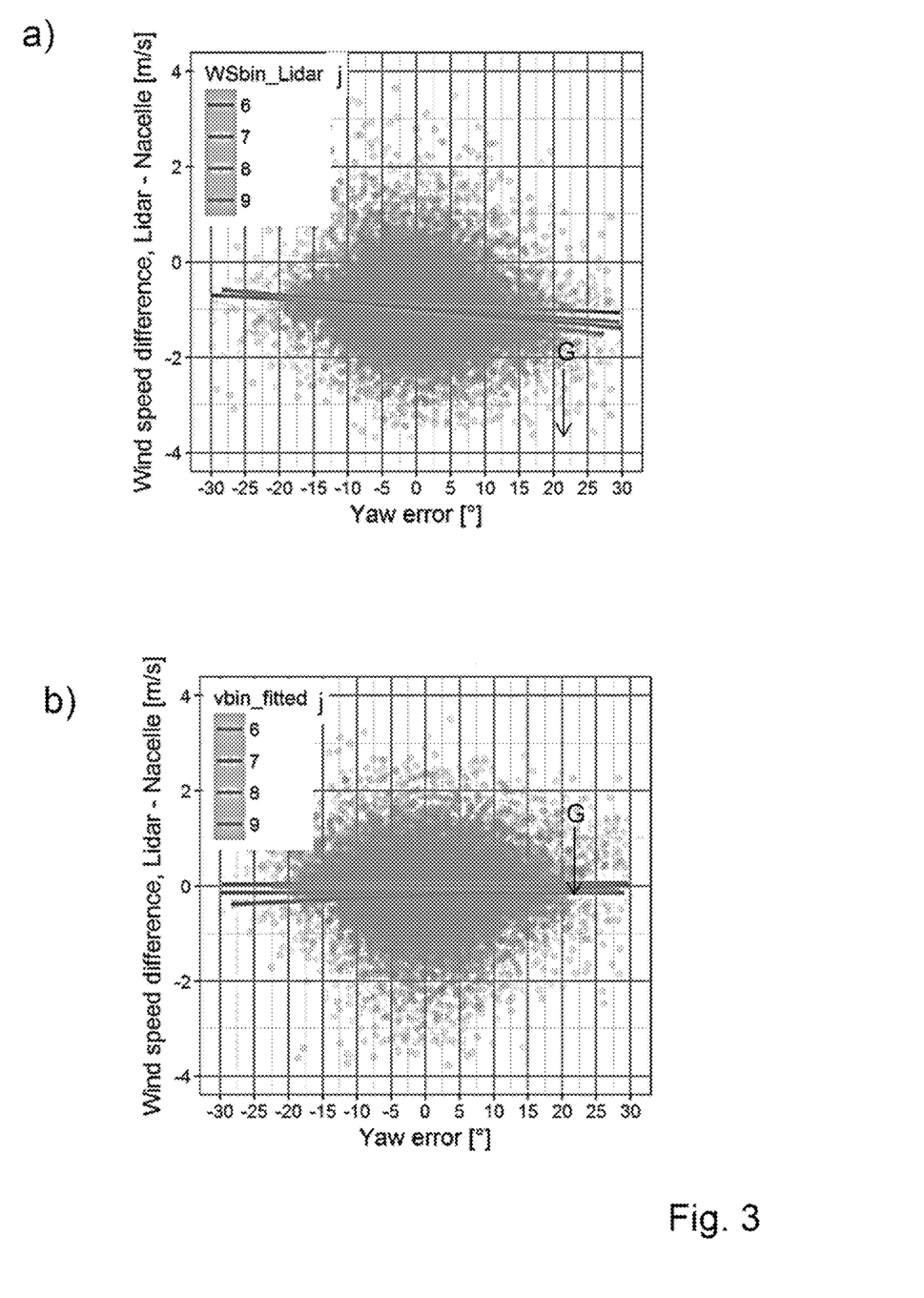
FIG. 3 an example for the effect of a correction of measured leeward wind speeds.

FIG. 3 shows an example for the effect of a correction of measured leeward wind speeds, by means of the method described in connection with FIG. 2 for determining a correction function for a wind turbine. For the graphs shown in FIGS. 3a) and b), windward wind speeds were measured by means of a Lidar instrument close to the ground on the windward side, directly in front of the wind turbine. The leeward wind speeds were measured by means of an anemometer arranged on the nacelle.

FIG. 3a) shows the relationship between measured leeward wind speeds and measured windward wind speeds as a function of a mis-alignment of a nacelle of the wind turbine, the measured leeward wind speeds not having been corrected with the correction function. The mis-alignment is preferably based on a measured leeward wind direction, to which a compensation value has been added, for example in order to compensate the effect of turbulences, generated by a rotor of the wind turbine, upon the measured leeward wind direction. Since the compensation value is preferably constant, the reference to the mis-alignment in the following may also be understood as referring to the leeward wind speed.

The measured wind speeds were grouped into wind-speed bins i=6, 7, 8, 9, and the difference between the measured windward wind speed and the measured leeward wind speed was in each case plotted against the mis-alignment. Alternatively, the differences could also be plotted directly against the leeward wind direction, on the basis of which the mis-alignment is determined. For each of the wind-speed bins i, the dependence of the difference on the mis-alignment was established by a linear fit. The compensation straight lines G established in this case are represented in FIG. 3a).

It becomes clear in this case that FIG. 3a) shows a drop in the measured leeward wind speed for positive alignment errors.

FIG. 3b) shows the relationship between corrected leeward wind speeds and measured windward wind speed as a function of the mis-alignment of the nacelle, the corrected leeward wind speeds being based on measured leeward wind speed, corrected by means of the correction function.

Here, also, the measured wind speeds were grouped into wind-speed bins j=6, 7, 8, 9, and the difference of the measured windward wind speed and the corrected leeward wind speed was in each case plotted against the mis-alignment. Likewise, for each of the wind-speed bins j, the dependence of the difference on the mis-alignment was determined by a linear fit. The compensation straight lines G determined in this case are represented in FIG. 3b).

It becomes clear in this case that the difference between the measured wind speed and the corrected leeward wind speed is not dependent, or at least is only slightly dependent, on the mis-alignment. Irrespective of how the wind is incident upon the rotor, it is possible to derive from the measured leeward wind speed, by means of the correction function, a corresponding windward wind speed that, at least substantially, corresponds to an independently measured windward wind speed.

Figure 4:
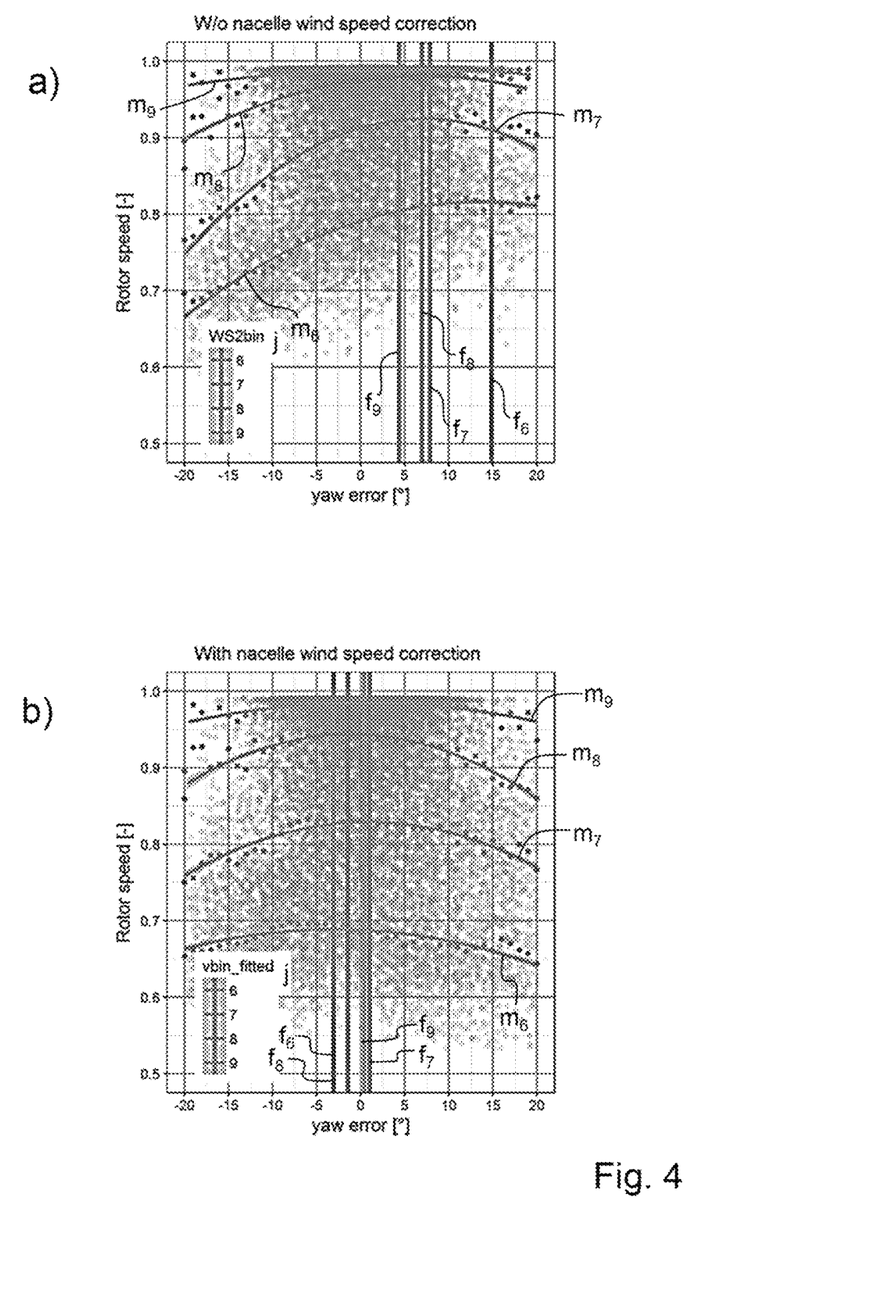
FIG. 4 an example for model functions on the basis of which alignment correction functions are determined.

FIG. 4 shows an example for model functions $m_i$, on the basis of which alignment correction functions $f_i$ can be determined, respectively, for a wind-speed bin j=6, 7, 8, 9. The model functions $m_i$ in this case preferably specify the relationship between a power measure, for example the rotor speed of a rotor of a wind turbine, and a mis-alignment of a nacelle of the wind turbine.

It has been found that the use of the rotor speed, i.e. the rotational speed of the rotor, in general even represents a better power measure than the use, for example, of the generator power. The reason for this is that the plotting of the rotor rotational speed over the mis-alignment results in more pronounced curves than the use of the power, with the result that it is made easier to determine the maximum, and thus the optimal operating point.

The mis-alignment in this case is preferably based on a measured leeward wind speed, to which a compensation value, for example for compensating turbulences, is added to the measurement. Since the compensation value is preferably constant, the reference to the mis-alignment in the following may also be understood as referring to the leeward wind speed.

The model functions $m_i$ are preferably determined in that the relationship between the power measure and the mis-alignment is based on a model, in particular a polynomial model, and the model is adapted by determining regression coefficients of the model. The regression coefficients may be determined, for example, by a fit of the measurement values for the power measure and for the mis-alignment with a polynomial.

In this case, the measurement values for the power measure and for the mis-alignment are preferably grouped into wind-speed bins j in dependence on a measured leeward wind speed, for which individual measurement values were preferably recorded in each case at at least substantially the same instant as individual measurement values for the power measure and the mis-alignment. The model functions $m_i$ can thus be determined in dependence on the wind speeds that are identified by the wind-speed bins j.

The alignment correction functions $f_i$ are determined on the basis of the model functions $m_i$ such that the alignment correction functions $f_i$ fulfil a predefined criterion in respect of the model functions $m_i$. As shown in FIG. 4, the alignment correction functions $f_i$ may each define that value for the alignment error at which the associated model function $m_i$ becomes maximal. Preferably, the alignment correction functions $f_i$ thus specify that angle by which the nacelle of the wind turbine must be rotated relative to a mis-alignment of 0°, in order to generate the maximum possible power for the given configuration of the wind turbine, for example with a particular angle of attack of rotor blades.

FIG. 4a) shows the model functions $m_i$ and alignment correction functions $f_i$, which were determined on the basis of a grouping of measurement values for the leeward wind speed, without the measurement values for the leeward wind speed having been corrected.

FIG. 4b) shows the model functions $m_i$ and alignment correction functions $f_i$, which were determined on the basis of a grouping of measurement values for the leeward wind speed, the measurement values for the leeward wind speed having been corrected by means of a correction function, which preferably was determined according to a method described in connection with FIG. 2. As can be seen, in this case lesser correction angles are obtained for the alignment correction function $f_i$ than in the case, shown in FIG. 4a, with uncorrected measurement values. In other words, a wind turbine whose alignment is corrected in dependence on a measured leeward wind direction in order to achieve an improved power yield is generally over-controlled, i.e. excessive correction of the alignment is performed. This can have a negative effect upon the power generated. On the other hand, a correction of the measured leeward wind speed represents a possibility for achieving an improved power yield.

In particular in the case of the model function $m_6$, i.e., in the case of the wind bin that corresponds to a wind speed of 6 m/s, it can be seen from FIG. 4a) that use of the leeward wind speed without a correction function gives a mis-alignment of 15°, whereas in FIG. 4b) a mis-alignment of approximately -3° is determined, by use of the leeward wind speed, by means of a correction function. This means that, without a correction of the leeward wind speed according to the invention, a windward wind speed is determined that leads to incorrect results. By contrast, an improved accuracy in the alignment of the wind turbine is achieved by the correction according to the invention, in the determination of which the measured leeward wind direction is taken into account. This renders possible, in particular, an improved power yield of the wind turbine.

Figure 5:
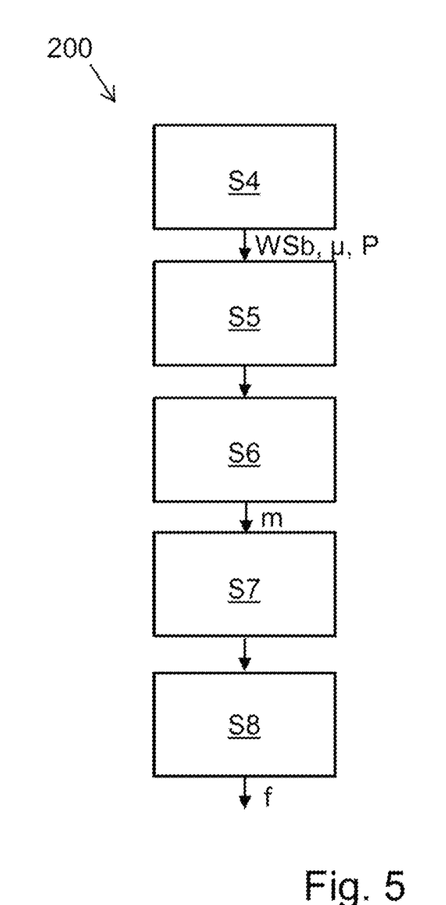
FIG. 5 a preferred exemplary embodiment of a method according to the invention for determining an alignment correction function.

FIG. 5 shows a preferred exemplary embodiment of a method 200 according to the invention for determining an alignment correction function f for a nacelle of a wind turbine that is arranged on a tower.

In a method step S4, a power measure P of the wind turbine, a leeward wind direction μ and a leeward wind speed WSb are measured. As described in connection with FIG. 1, in this case preferably a multiplicity of measurement values for the leeward wind direction μ are generated and recorded by at least one anemometer, and a multiplicity of measurement values for the leeward wind speed WSb are generated and recorded by a wind vane, over a defined time period, the wind vane and the at least one anemometer being arranged on the leeward side of a rotor of the wind turbine. In the same time period, a multiplicity of measurement values for a power measure P of the wind turbine are also recorded.

In a further method step S5, the measurement values for the power measure P and the measurement values for the leeward wind direction p are assigned to the measurement values for the leeward wind speed WSb, on the basis of the instants at which the measurement values were recorded. The measurement values for the leeward wind speeds WSb, in turn, are grouped into at least one wind-speed bin, such that, in a further method step S6, for the at least one wind-speed bin, a model function m can be determined for a relationship between the power measure P and the leeward wind direction μ on the basis of those measurement values, for the power measure P and for the leeward wind direction μ, that are assigned to the measurement values for the leeward wind speed WSb that are grouped into the at least one wind-speed bin.

In the method step S6, the model function m is preferably based on a polynomial model having a plurality of regression coefficients, such that adaptation can be effected to the measured relationship between the power measure P and the leeward wind direction μ, preferably by means of a compensation calculation, in particular a regression analysis. The regression coefficients determined in this case allow a precise assignment of each measured power measure P to a leeward wind direction μ.

In a further method step S7, the model function m can be used to determine an alignment correction function f, wherein it is preferably taken into account that the alignment correction function f is intended to fulfil a predefined criterion in respect of the model function m, for example the maximization of the model function m. In this case, the alignment correction function f determined in such a manner is preferably used for a target alignment of the nacelle relative to the measured leeward wind direction μ, for example in order to increase the power generated by the wind turbine.

The determined alignment correction function f is output in a further method step S8.

If necessary, in the method 200 described above, a misalignment of the nacelle, obtained from the leeward wind direction and a compensation value, in particular a constant compensation value, may also be used instead of the leeward wind direction μ.

Figure 6:
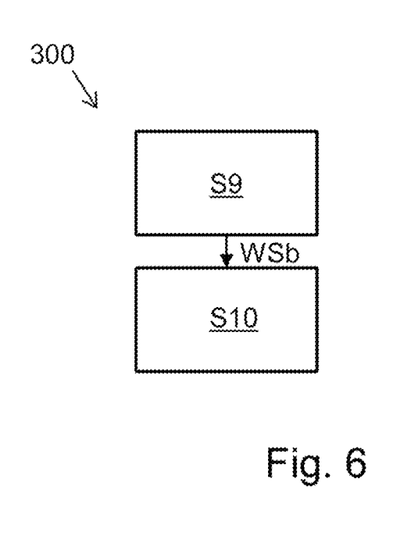
FIG. 6 a preferred exemplary embodiment of a method according to the invention for operating a wind turbine.

FIG. 6 shows a preferred exemplary embodiment for a method 300 according to the invention for operating a wind turbine that has a nacelle arranged on a tower, a rotor and an anemometer, the anemometer being arranged on the leeward side of the rotor.

In a method step S9, a leeward wind speed WSb is determined by means of the anemometer. This leeward wind speed WSb may be used, in a further method step S10, to align the nacelle by applying an alignment correction function, which is preferably determined according to a method described in connection with FIG. 5.

For example, the measured leeward wind speed WSb may be used to determine, by means of an operating characteristic that is given by the alignment correction function, a correction angle by means of which the nacelle can be deflected further relative to an alignment in which a misalignment of the nacelle is at least substantially zero, in order to achieve an improvement in the power generated by the wind turbine.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

LIST OF REFERENCES 1 system for determining an alignment correction function
2a, 2b anemometer
3 wind vane
3a wind vane
4 control facility
4a means for recording
4b means for assigning
4c means for determining a model function
4d means for determining an alignment correction function
4e interface
10 wind turbine
11 nacelle
12 rotor
100 method for determining a correction function
200 method for determining an alignment correction function
300 method for operating a wind turbine
X rotor axis
E plane
WSa windward wind speed
WSb leeward wind speed
WR windward wind direction
P power measure
μ leeward wind direction
j wind-speed bin
δ compensation value
γ mis-alignment
m model function
f alignment correction function
v correction function
G compensation straight lines
S1-S10 method steps

What is claimed is:

1. A method for determining a correction function for a wind turbine, by means of which a windward wind speed can be determined on the basis of a leeward wind speed measured by a leeward-side anemometer of the wind turbine, windward and leeward relating to a rotor of the wind turbine, comprising:

measuring a measured windward wind speed, a measured leeward wind speed, and a measured leeward wind direction, whereby a multiplicity of measurement values is recorded for each of the measured windward wind speed, the measured leeward wind speed, and the measured leeward wind direction in a defined time period; and determining the correction function on the basis of the recorded measurement values by means of a model, the recorded measurement values being related to each other in the model, and the correction function assigning an inferred windward wind speed to a given leeward wind speed in dependence on a given leeward wind direction; and outputting the determined correction function.

2. The method according to claim 1, the model being a multilinear regression model.

3. The method according to claim 1, wherein the correction function is further determined on a basis of a compensation calculation.

4. The method according to claim 3, wherein the correction function is determined on a basis of a regression analysis.

5. The method according to claim 1, the measured windward wind speed being determined by means of a sensor device.

6. The method according to claim 5, wherein the sensor device is arranged on the windward side and separately from the wind turbine.

7. The method according to claim 6, wherein the sensor device is arranged on an adjacent wind turbine.

8. The method according to claim 5, wherein the sensor device is configured as a Lidar instrument, a Sodar instrument, or a reference anemometer.

9. A method for determining an alignment correction function for a nacelle of a wind turbine that is arranged on a tower, the wind turbine having at least one anemometer arranged on a leeward side of a rotor of the wind turbine and a wind vane arranged on the leeward side of the rotor, the method comprising:

determining a correction function for the wind turbine, by means of which a windward wind speed can be determined on the basis of a leeward wind speed measured by the at least one anemometer arranged on the leeward side of the rotor of the wind turbine, windward and leeward relating to the rotor of the wind turbine, wherein determining the correction function for the wind turbine comprises:

measuring a measured windward wind speed, a measured leeward wind speed, and a measured leeward wind direction, whereby a multiplicity of measurement values is recorded for each of the measured windward wind speed, the measured leeward wind speed, and the measured leeward wind direction in a defined time period; and determining the correction function on a basis of the recorded multiplicity of measurement values by means of a model, the recorded multiplicity of measurement values being related to each other in the model, and the correction function assigning an inferred windward wind speed to a given leeward wind speed in dependence on a given leeward wind direction;

measuring a power measure of the wind turbine, a further leeward wind direction by means of the wind vane, and a further leeward wind speed by means of the at least one anemometer, wherein a second multiplicity of measurement values are recorded for each of the power measure of the wind turbine, the further leeward wind direction, and the further leeward wind speed over a second defined time period;

assigning the second multiplicity of measurement values of the power measure and of the further leeward wind direction to the second multiplicity of measurement values of the further leeward wind speed that are grouped into at least one wind-speed bin on a basis of instants at which the second multiplicity of measurement values were recorded, the second multiplicity of measurement values of the further leeward wind speed being corrected by means of the correction function;

determining a model function for a relationship between the power measure and the further leeward wind direction for the at least one wind-speed bin;

determining the alignment correction function for a target alignment of the nacelle relative to the measured further leeward wind direction on a basis of the model function, the alignment correction function fulfilling a predefined criterion in respect of the determined model function for the at least one wind-speed bin; and outputting the determined alignment correction function.

10. The method according to claim 9, the criterion being a maximization of the model function.

11. The method according to claim 9, the power measure being a rotor rotational speed of the rotor or a generator rotational speed of a generator of the wind turbine.

12. The method according to claim 9, the model function being determined for a plurality of wind-speed bins, and the output alignment correction function forming an operating characteristic for the target alignment of the nacelle relative to the measured further leeward wind direction.

13. The method according to claim 9, further comprising a method for operating the wind turbine, the method for operating the wind turbine comprising:

determining a current leeward wind speed by means of the at least one anemometer; and aligning the nacelle by use of the alignment correction function, and taking into account the determined current leeward wind speed.

14. The method according to claim 13, wherein the alignment correction function comprises an operating characteristic.

15. A computer program, which comprises instructions that, when they are executed by a computer, cause the computer to execute a method according to claim 1.

16. A computer-readable medium, on which a computer program according to claim 15 is stored.

17. A system for determining an alignment correction function for a nacelle of a wind turbine that is arranged on a tower and has at least one anemometer, a wind vane, and a control facility, the at least one anemometer and the wind vane arranged on a leeward side of a rotor of the wind turbine, and the control facility configured to:

record a second multiplicity of measurement values of a further leeward wind speed determined by the at least one anemometer, of a further leeward wind direction determined by the wind vane, and of a power measure of the wind turbine, over a second defined time period;

assign the second multiplicity of measurement values of the power measure and of the further leeward wind direction to the second multiplicity of measurement values of the further leeward wind speed that are grouped into at least one wind-speed bin, on a basis of instants at which the second multiplicity of measurement values were recorded, the second multiplicity of measurement values of the further leeward wind speed being corrected by the correction function determined according to a method according to claim 1;

determine a model function for a relationship between the power measure and the further leeward wind direction for the at least one wind-speed bin;

determine the alignment correction function for a target alignment of the nacelle relative to the measured further leeward wind direction on a basis of the model function, the alignment correction function fulfilling a predefined criterion in respect of the determined model function for the at least one wind-speed bin; and output the determined alignment correction function via an interface.

\* \* \* \* \*